(12) United States Patent
Albright et al.

(10) Patent No.: US 6,191,386 B1
(45) Date of Patent: Feb. 20, 2001

(54) METHOD AND APPARATUS FOR INITIATING, DIRECTING AND CONSTRICTING ELECTRICAL DISCHARGE ARCS

(75) Inventors: Charles E. Albright, Powell; Joseph W. Rich, Worthington, both of OH (US); Richard B. Miles, Princeton, NJ (US); Walter R. Lempert, Columbus, OH (US); Sergy O. Macheret, Princeton, NJ (US)

(73) Assignee: The Ohio State University, Columbus, OH (US)

( * ) Notice: Under 35 U.S.C. 154(b), the term of this patent shall be extended for 0 days.

(21) Appl. No.: 09/296,957

(22) Filed: Apr. 22, 1999

(51) Int. Cl.$^7$ .................................................. B23K 9/067
(52) U.S. Cl. ...................................... 219/130.4; 361/117
(58) Field of Search ........................... 219/130.4, 141.61, 219/121.62, 121.64; 315/149; 361/117, 213, 232

(56) References Cited

U.S. PATENT DOCUMENTS

| | | | |
|---|---|---|---|
| 3,719,829 | * 3/1973 | Vaill | 315/149 |
| 3,775,638 | * 11/1973 | Tidman | 219/121.62 |
| 4,017,767 | * 4/1977 | Ball | 361/117 |
| 4,167,662 | * 9/1979 | Steen | 219/121.64 |
| 4,453,196 | * 6/1984 | Herr | 361/232 |
| 4,689,466 | * 8/1987 | Hoshinouchi et al. | 219/121.61 |
| 5,175,664 | * 12/1992 | Diels et al. | 361/117 |
| 5,726,855 | * 3/1998 | Mourou et al. | 361/213 |
| 5,821,493 | * 10/1998 | Beyer et al. | 219/121.64 |
| 5,859,402 | * 1/1999 | Maier | 219/121.64 |

* cited by examiner

Primary Examiner—Clifford C. Shaw
(74) Attorney, Agent, or Firm—Standley & Gilcrest LLP (57) ABSTRACT

A method and associated apparatus for initiating and guiding an electrical discharge arc. This method preferably comprises the steps of: providing a laser beam through a predetermined gas comprising molecules amenable to vibrational excitation by a laser beam so as to cause vibrational excitation of the molecules and to define a beam path in a direction of desired electrical discharge; and propagating an electrical discharge arc so as to intersect the beam path, whereby the electrical discharge arc is directed along the beam path.

55 Claims, 5 Drawing Sheets

METHOD AND APPARATUS FOR INITIATING, DIRECTING AND CONSTRICTING ELECTRICAL DISCHARGE ARCS

BACKGROUND

Electric arc welding processes have become one of the most important welding techniques, particularly for joining steels. Electric arc welding generally involves the supplying of either direct or alternating current for creating an electric arc which generates enough heat to melt metal for the weld. Although arc welding produces welds having high join quality and join strength, arc welding has some drawbacks. For example, arc welding has traditionally resulted in distortion and spatter. Prior to the present invention, there was no cost effective or efficient way to control the electric discharges produced in arc welding technology.

It is known to control electric discharge by using high power laser sources which thermally ionize the local atmosphere. This process requires the use of ultraviolet lasers, which are strongly absorbed in the atmosphere, or very high power lasers which cause thermal breakdown in the local atmosphere. This approach tends to generate localized regions of ionization where the electric discharge is initiated. Guiding the electric discharge over a long path is difficult since both the ionization and the breakdown processes cause strong attenuation and scattering of the laser beam. Additionally, since breakdown requires a high field strength, the breakdown process tends to be localized at the laser focus rather than uniformly distributed along the path length of the laser beam itself.

The present invention discloses a new approach of controlling electric discharges by the production of excited molecules along the desired path of the discharge. More particularly, the invention discloses an approach to controlling electric discharges by the production of metastable molecules using a low power laser. The present invention is advantageous in that:

1.) a low power laser may be used to vibrationally excite predetermined molecules so as to guide an electric discharge;
2.) vibrational states of the molecules may be excited with little, if any, rotational or translational molecular energy conversion, i.e., the molecules do not experience generalized heating;
3.) the present invention may provide arc initiation, path stablilization and discharge constriction;
4.) the laser beam may be pulsed;
5.) the arc may be pulsed;
6.) both laser beam and arc may be pulsed;
7.) low powered, relatively inexpensive, lasers may be used to control electric discharges;
8.) rapid arc movement and accurate arc position are achieved;
9.) the discharge can be constricted to a very small cross section allowing constriction of an arc into a high power density heat source; and
10.) small area, high power density discharges may be controlled allowing for small welds (e.g., smaller than 3 mm wide) and deep penetration welding (e.g., where depth of penetration is greater than weld width).

SUMMARY OF THE INVENTION

The present invention includes a method of initiating an electrical discharge arc. This method preferably comprises the steps of: (a) providing a laser beam through a predetermined gas comprising molecules amenable to vibrational excitation by a laser beam so as to cause vibrational excitation of said molecules and to define a beam path in a direction of desired electrical discharge; (b) propagating an electrical discharge arc so as to intersect said beam path, whereby said electrical discharge arc is directed along said beam path.

In other terms, the method of the present invention comprises the steps of: (a) providing a laser beam through an arc shielding gas, the gas comprising molecules amenable to vibrational excitation by the laser beam, so as to define a beam path comprising molecules vibrationally excited by the laser beam without substantially heating the gas; and (b) propagating an electrical discharge arc along the laser beam path and the vibrationally excited molecules.

The laser beam and the electrical discharge arc may be maintained substantially continuously, or laser beam and the electrical discharge arc may be pulsed. It is also possible that the laser beam is maintained substantially continuously while the electrical discharge arc is pulsed.

The arc shielding gas(es) may be one appropriate arc shielding gas or a mixture of two or more appropriate arc shielding gases, such as those known and used in the art. Such gases may include argon, helium, carbon dioxide or a mixture therein. Gas may be introduced into the shielding gas, these gases having molecules amendable to vibrational excitation by the laser of the present invention. Such gases may be selected from the group consisting of carbon monoxide, oxygen or nitrogen, for example.

The present invention includes a method of directing an electrical discharge arc along a first vector path. The method in broadest terms comprising the steps: (a) providing a laser beam through an arc shielding gas, the gas comprising molecules amenable to vibrational excitation by the laser beam, so as to define a beam path, the beam path directed along a first vector path comprising molecules vibrationally excited by the laser beam without substantially heating the gas; and (b) propagating an electrical discharge arc along a second vector path so as to intersect the first vector path, whereby the electrical discharge arc is directed along the first vector path and through the vibrationally excited molecules.

As in the method of initiating arcs, the laser beam and the electrical discharge arc may be maintained substantially continuously, or laser beam and the electrical discharge arc may be pulsed. It is also possible that the laser beam is maintained substantially continuously while the electrical discharge arc is pulsed. Where pulsed, the pulses of the laser beam typically range in duration from whole seconds to whole milliseconds, while the pulses of the electrical discharge arc typically range in duration from whole seconds to whole microseconds.

The arc shielding gas(es) may be one appropriate arc shielding gas or a mixture of two or more appropriate arc shielding gases, as described above.

Another aspect of the present invention includes a method of constricting an electrical discharge arc, the method comprising the steps: (a) providing a laser beam through an arc shielding gas, the gas comprising molecules amenable to vibrational excitation by the laser beam, so as to define a beam path, the beam path having a first cross-section area and comprising molecules vibrationally excited by the laser beam without substantially heating the gas; and (b) propagating an electrical discharge arc initially having a second cross-section area greater than the first cross-section area along the beam path and through the vibrationally excited molecules, whereby the electrical discharge arc is constricted so as to have a cross-section area less than the second cross-section area.

As in the methods of initiating and directing arcs, the laser beam and the electrical discharge arc may be maintained substantially continuously, or the laser beam and the electrical discharge arc may be pulsed. It is also possible that the laser beam is maintained substantially continuously while the electrical discharge arc is pulsed.

The arc shielding gas(es) may be one appropriate arc shielding gas or a mixture of two or more appropriate arc shielding gases, as described above.

The present invention also includes an apparatus for initiating an electrical discharge arc, the apparatus comprising: (a) a source of an arc shielding gas; (b) a laser adapted to provide a laser beam through the arc shielding gas, the gas comprising molecules amenable to vibrational excitation by the laser beam, so as to define a beam path comprising molecules vibrationally excited by the laser beam without substantially heating the gas; and (c) a source of an electrical discharge arc adapted to provide an electrical discharge along the laser beam path and through the vibrationally excited molecules.

The laser may be adapted to maintain the laser beam substantially continuously, and the source of an electrical discharge may be adapted to maintain the electrical discharge arc substantially continuously. Alternatively, the laser may be adapted to pulse the laser beam, and the source of an electrical discharge may be adapted to pulse the electrical discharge arc. The apparatus also may be such that the laser is adapted to maintain the laser beam substantially continuously, while the source of an electrical discharge is adapted to pulse the electrical discharge arc. The laser beam and electrical discharge may be pulsed as described above.

The present invention further includes an apparatus for directing an electrical discharge arc along a first vector path, the apparatus comprising: (a) a source of an arc shielding gas; (b) a laser adapted to provide a laser beam through the arc shielding gas, the gas comprising molecules amenable to vibrational excitation by the laser beam, so as to define a beam path, the beam path directed along a first vector path comprising molecules vibrationally excited by the laser beam without substantially heating the gas; and (c) a source of an electrical discharge arc adapted to provide an electrical discharge along a second vector path so as to intersect the first vector path, whereby the electrical discharge arc is directed along the first vector path and through the vibrationally excited molecules.

The laser may be adapted to maintain the laser beam substantially continuously, and the source of an electrical discharge may be adapted to maintain the electrical discharge arc substantially continuously. Alternatively, the laser may be adapted to pulse the laser beam, and the source of an electrical discharge may be adapted to pulse the electrical discharge arc. The apparatus also may be such that the laser is adapted to maintain the laser beam substantially continuously, while the source of an electrical discharge is adapted to pulse the electrical discharge arc. The pulses of the laser beam and electrical discharge may be as described above.

Also part of the present invention is an apparatus for directing an electrical discharge arc along a first vector path, the apparatus comprising: (a) a source of an arc shielding gas; (b) a laser adapted to provide a laser beam through an arc shielding gas, the gas comprising molecules amenable to vibrational excitation by the laser beam, so as to define a beam path, the beam path having a first cross-section area and comprising molecules vibrationally excited by the laser beam without substantially heating the gas; and (c) a source of an electrical discharge arc adapted to provide an electrical discharge arc initially having a second cross-section area greater than the first cross-section area along the beam path and through the vibrationally excited molecules, whereby the electrical discharge arc is constricted so as to have a cross-section area less than the second cross-section area.

The laser may be adapted to maintain the laser beam substantially continuously, and the source of an electrical discharge may be adapted to maintain the electrical discharge arc substantially continuously. Alternatively, the laser may be adapted to pulse the laser beam, and the source of an electrical discharge may be adapted to pulse the electrical discharge arc. The apparatus also may be such that the laser is adapted to maintain the laser beam substantially continuously, while the source of an electrical discharge is adapted to pulse the electrical discharge arc. The pulses of the laser beam and electrical discharge may be as described above.

The various apparatus of the present invention for initiating, directing and/or constricting arcs as described above may be used as an industrial heat source adapted to perform any desired operation, such as those selected from the group consisting of welding, cutting, drilling, surface treating, marking, and combinations thereof. Such industrial heat sources may additionally comprise a robotic device adapted to position the industrial heat source.

The present invention also includes a method of directing a natural lightning discharge through the earth's atmosphere and along a first vector path to the earth, the method comprising the steps: (a) providing a laser beam through the earth's atmosphere and along a first vector path, the earth's atmosphere comprising molecules amenable to vibrational excitation by the laser beam, so as to define a beam path, the beam path directed along a first vector path comprising molecules vibrationally excited by the laser beam without substantially heating the atmosphere; and (b) allowing a natural lightning discharge to propagate along a second vector path so as to intersect the first vector path, whereby the natural lightning discharge is directed along the first vector path and through the vibrationally excited molecules to the earth.

The method of the present invention may be practiced through the use of one or more lasers of appropriate strength directed through the earth's atmosphere and along a vector along which it is desired to direct a natural lightning discharge. The laser(s) may be supported by a pre-existing support such as a building tower, or electrical or telephone wire support poles or towers, or a support especially constructed for the purpose of supporting the laser(s).

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
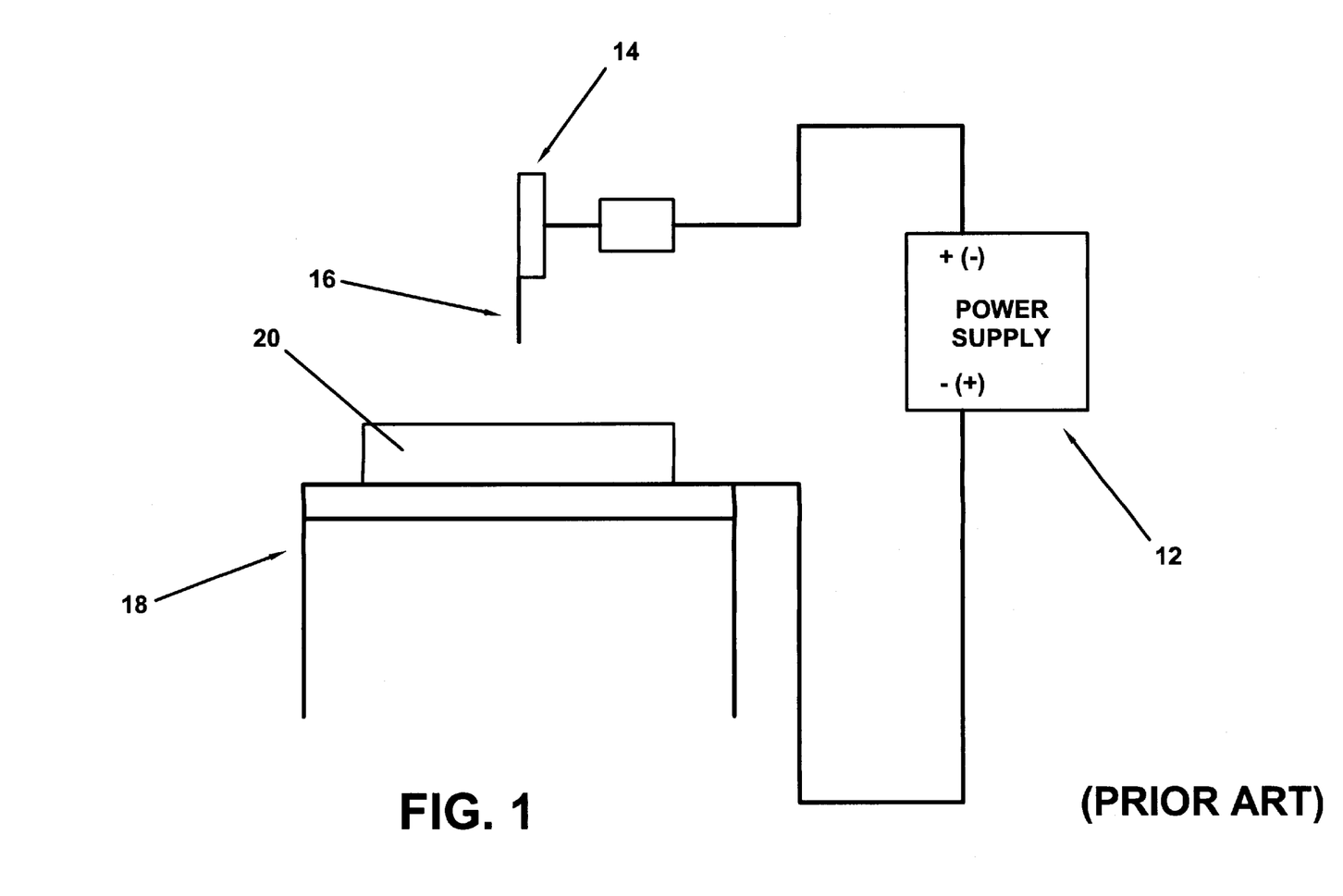
FIG. 1 illustrates one example of an arc welding circuit.

FIG. 1 illustrates a typical arc welding circuit. In general, arc welding is a joining process involving intense heat produced by an electric arc. Generally, metal at a joint between two parts to be joined is melted and bonded (a filler material may be used to form the joint). A typical arc welding circuit is preferably comprised of: a welding power supply 12, an electrode holder 14, an electrode 16 and a work bench 18. In arc welding, the arc is formed between the electrode 16 and a workpiece 20. For example, once the welding power supply 12 is turned on, the tip of the electrode 16 is placed in contact with the grounded workpiece 20, then withdrawn. Once withdrawn, an arc is formed between the workpiece 20 and the electrode 16. The arc produces a temperature at the tip of the electrode that is high enough to melt most metals. The heat melts metal in the vicinity of the arc and any filler material supplied by the electrode 16 or by a separately introduced rod or wire if such is used.

The most common types of arc welding processes are:

a.) Shielded Metal Arc Welding (SMAW);

b.) Gas Tungsten Arc Welding (GTAW);

c.) Gas Metal Arc Welding (GMAW); and d.) Submerged Arc Welding (SAW). Although the principles of the present invention may be used with any of the above known processes, the following description relates to a laser-arc welding embodiment where a shielding gas 22 is used. For example, in one embodiment, a gas tungsten arc torch and power supply may be used to provide a continuous and pulsed discharge along the excited laser path.

Figure 2:
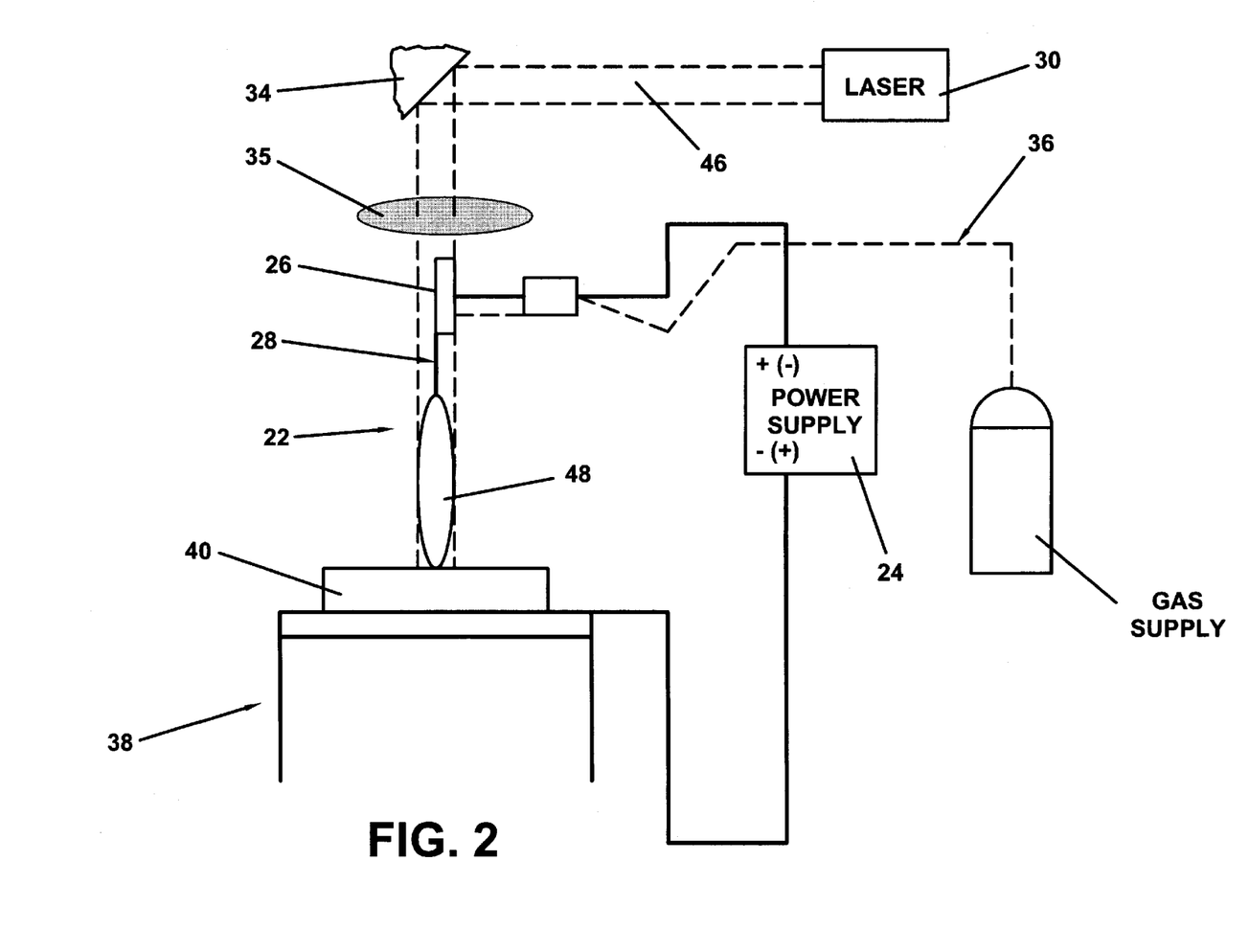
FIG. 2 illustrates one example of a laser-arc welding circuit.
Figure 3:
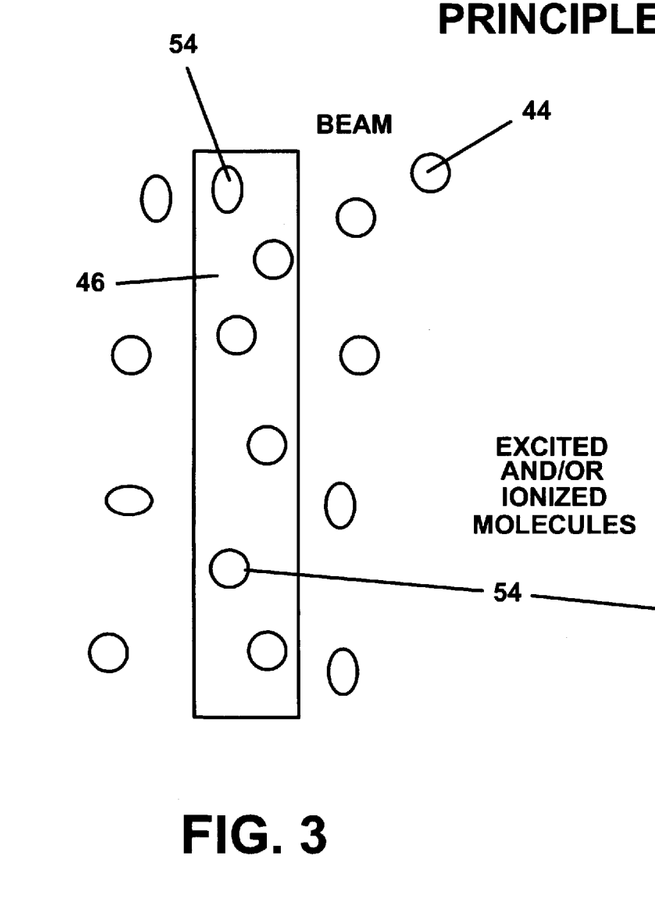
FIG. 3 illustrates the excitation of molecules by a laser beam.
Figure 4:
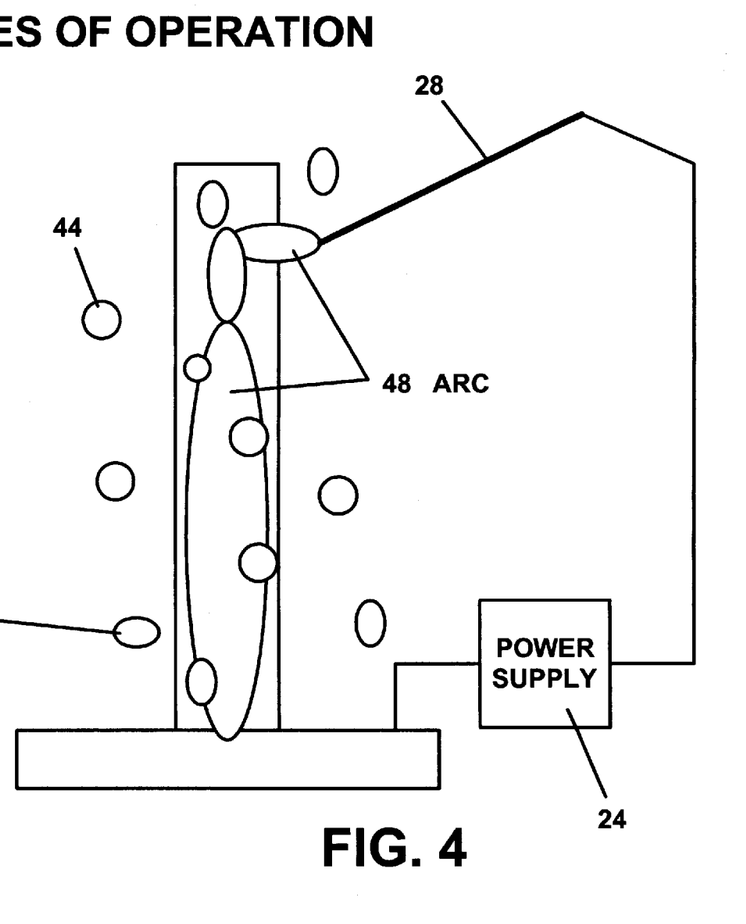
FIG. 4 illustrates guidance of an electric arc by the beam path of vibrationally excited molecules.

FIG. 2 illustrates a block diagram of one embodiment of a laser-arc welding circuit of the present invention. The laser-arc welding circuit may be comprised of: a power supply 24, an electrode holder 26, an electrode 28, a laser 30, a mirror 34, a lens 35, a gas supply line 36, a work bench 38, and a work piece 40. A predetermined shielding gas 22 is supplied via the gas supply line 36 during the welding process. The shielding gas 22 forms a protective layer around the arc and prevents oxidization of the of the weld metal. Predetermined molecules 44, some of which are described below, may be added to the shielding gas 22. These molecules 44 may be excited by the laser 30, e.g., the predetermined molecules 44 may act to absorb light from the laser 30, see FIG. 3. In the embodiment of FIG. 2, these molecules 44 are mixed with the shielding gas 22 and supplied via the gas supply line 36. It is also appreciated that these gas molecules 44 may be added via a line separate from the shielding gas line 36. The mirror 34 and lens 35 guide and focus the laser beam 46 as needed (it is also appreciated that the laser may be positioned directly above the workpiece 40 without use of a mirror 34 or lens 35.) The initiated arc 48 will follow the path of excited molecules 54, see FIG. 4. Accordingly, the present invention provides all of the advantages as previously listed, including accurate arc position and rapid arc movement.

Figure 5:
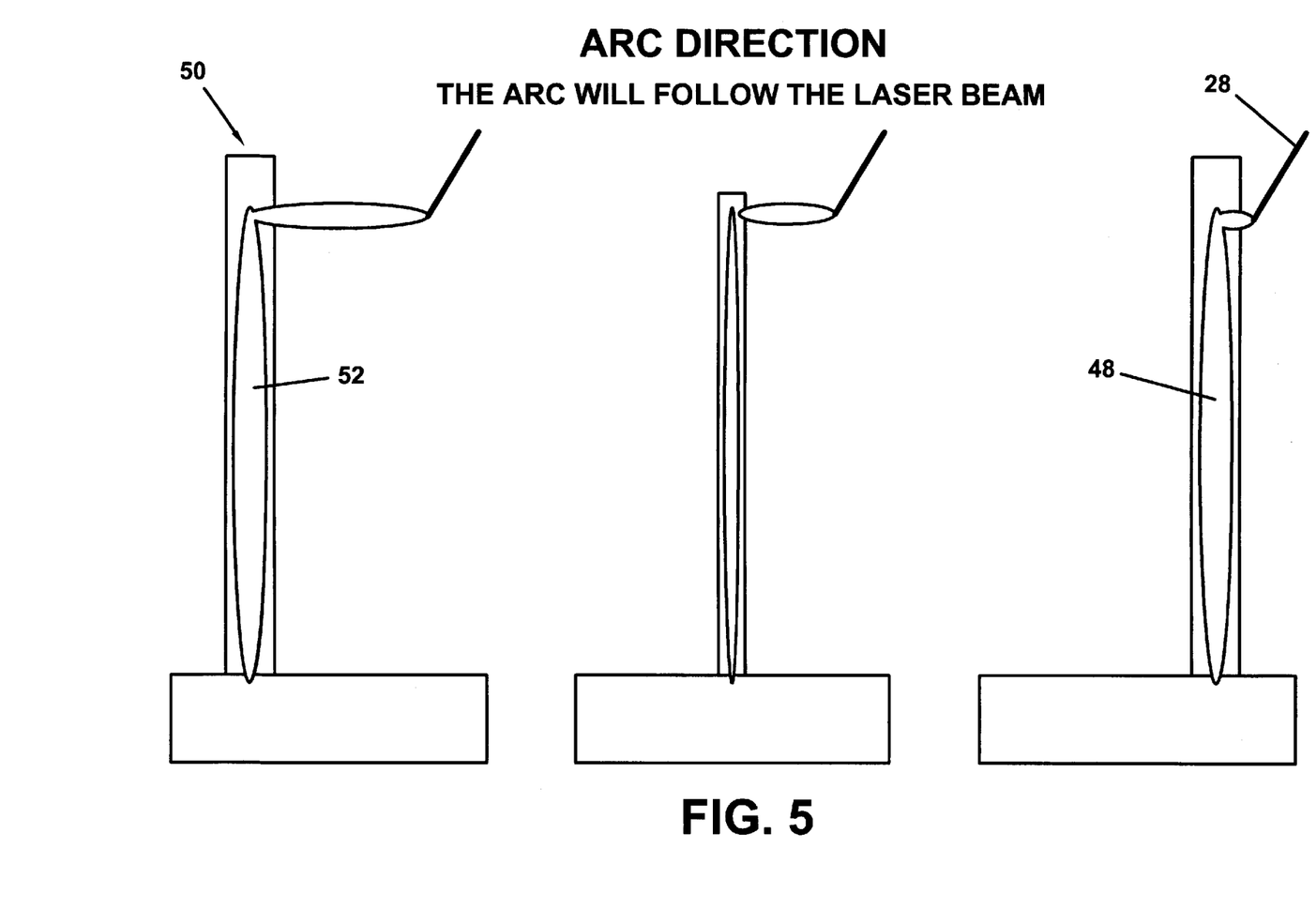
FIG. 5 illustrates examples of how the present invention may be used to constrict the cross-sections of electric arcs.
Figure 6:
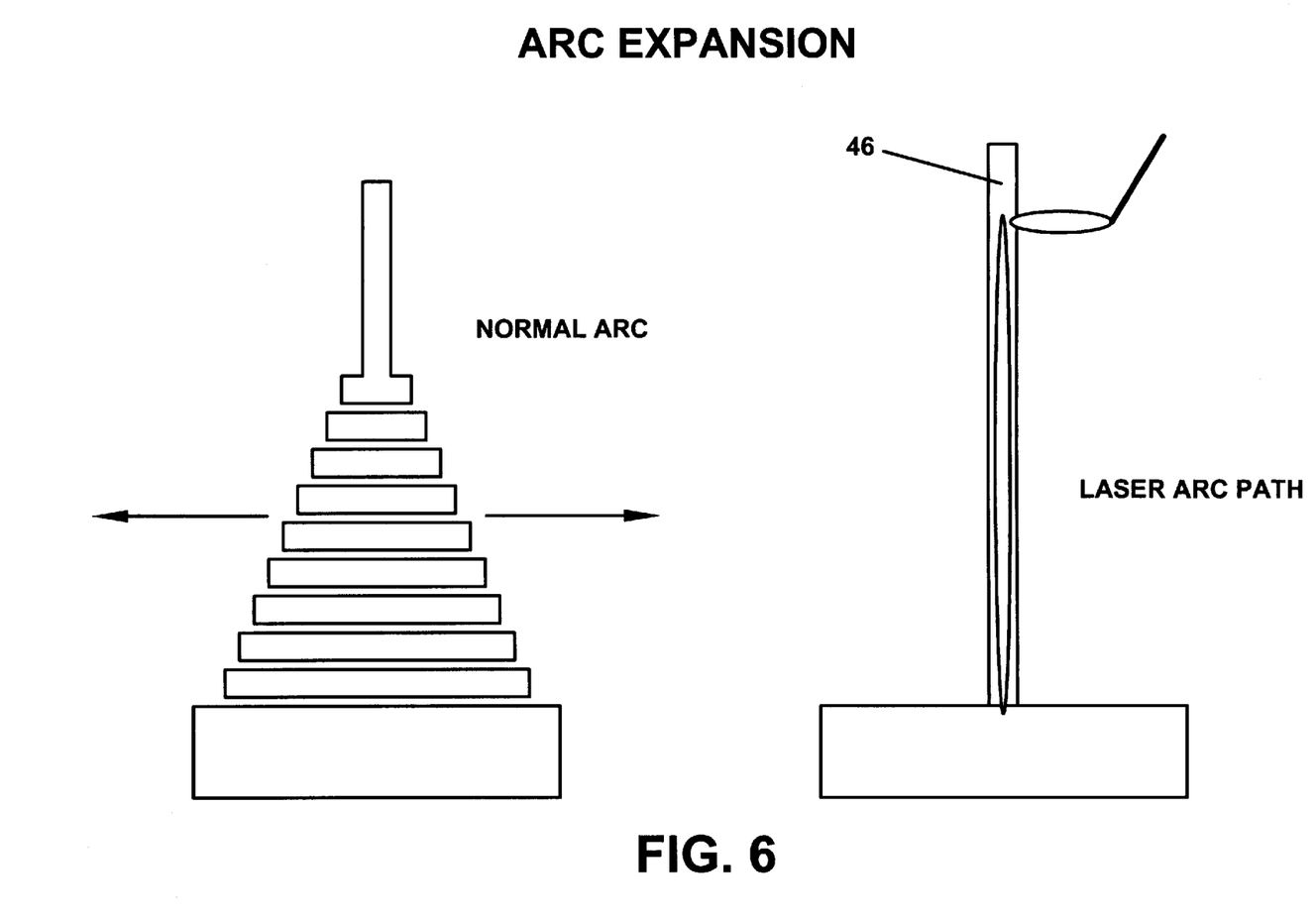
FIG. 6 illustrates arc expansions of electric arcs without the use of a beam path and with the use of a beam path of the present invention.

The laser beam 46 may be varied in size so as to constrict the arc size, see FIG. 5 and FIG. 6. The method of constricting an electrical discharge arc is preferably comprised of the steps of: (a) providing a laser beam 46 through an arc shielding gas 22, the gas comprising molecules 44 amenable to excitation by the laser beam, so as to define a beam path, the beam path having a first cross-section area 50 and comprising molecules excited 54 by the laser beam without substantially heating the gas; and (b) propagating an electrical discharge arc 48 initially having a second cross-section area greater than the first cross-section area 50 along the beam path and through the excited molecules 54, whereby the electrical discharge arc 48 is constricted so as to have a cross-section area 52 less than the second cross-section area.

The following paragraphs discuss further details of the laser-arc welding process of the present invention and example applications.

Shielding Gases

The arc shielding gas(es) 22 may be one appropriate arc shielding gas or a mixture of two or more appropriate arc shielding gases, such as those known and used in the art. For example, such gases include those selected from the group consisting of carbon dioxide, argon, helium, or a mixture therein. The shielding gas 22 chosen may vary based on the specifics of the welding process and the type of laser 30 used in the present invention.

Lasers

As discussed with reference to FIG. 2, the present invention further includes an apparatus for directing an electrical discharge arc 48 along a first vector path, the apparatus comprising: (a) a source of an arc shielding gas 36; (b) a laser 30 adapted to provide a laser beam 46 through the arc shielding gas 22, the gas comprising molecules 44 amenable to vibrational excitation by the laser beam 46 so as to define a beam path, the beam path directed along a first vector path comprising molecules vibrationally excited 54 by the laser beam 46 without substantially heating the gas; and (c) a source of an electrical discharge arc 28 adapted to provide an electrical discharge along a second vector path so as to intersect the first vector path, whereby the electrical discharge arc 48 is directed along the first vector path and through the vibrationally excited molecules 54.

The laser 30 is preferably chosen in relation to the specific molecules 44 to be inserted into the shielding gas 22, or vice versa. In other words, the gas molecule compositions are preferably chosen that respond to pumping, and a laser 30 is preferably chosen that has a wavelength corresponding to the specific molecules.

The laser 30 may be adapted to maintain the laser beam 46 substantially continuously, and the source of an electrical discharge 28 may be adapted to maintain the electrical discharge arc 48 substantially continuously. Alternatively, the laser 30 may be adapted to pulse the laser beam 46, and the source of an electrical discharge 28 may be adapted to pulse the electrical discharge arc 48.

The apparatus may be such that the laser 30 is adapted to pulse the laser beam 46 while the source of an electrical discharge 28 is adapted to maintain the electrical discharge arc 48 substantially continuously. The apparatus also may be such that the laser 30 is adapted to maintain the laser beam 46 substantially continuously while the source of an electrical discharge 28 is adapted to pulse the electrical discharge arc 48. In many cases the laser 30 is pulsed in order to more efficiently excite the metastable state. The table below lists a few examples of lasers which may be used in the present invention.

Molecules Mixed with the Shielding Gas

As discussed, predetermined gases having vibrationally excitable molecules 44 may be introduced into the shielding gas 22. In an alternative embodiment, the molecules in the shielding gas 22 or the oxygen molecules in air may be vibrationally excited without the addition of specific gases for that purpose. These molecules are vibrationally excited by the laser 30 which forms a beam path 46 in which to guide the electric arc 48.

It is appreciated that many different molecules 44 may be used with the present invention. Generally, gases having molecules 44 amendable to vibrational excitement by a relatively low power laser 30 are preferred. Carbon monoxide (CO) and nitrogen (NO) molecules provide benefits as their molecular systems are also compatible as shielding gas components for many steel welding and cutting applications. These CO and NO molecules be vibrationally excited by a CO laser capable of only a few watts of beam power.

EXAMPLE EMBODIMENTS

| Embodiment | Shielding Gas | Inserted Molecules | Laser |
|---|---|---|---|
| 1 | Ar | 1% CO | CO or NO |
| 2 | Ar | 5% CO | CO or NO |
| 3 | He | 1% CO | CO or NO |
| 4 | He | 5% CO | CO or NO |
| 5 | Ar | 1% NO | CO or NO |
| 6 | Ar | 5% NO | CO or NO |
| 7 | He | 1% NO | CO or NO |
| 8 | He | 5% NO | CO or NO |
| 9 | | n/a (oxygen in air) | combination red-green laser (wavelengths of .532 and .58 microns). |
| 10 | Ar/He | Aromatic Hydrocarbons | Argon or KrF or YeCl Eximer |
| 11 | (Cs, K) | Argon Ion Laser | Ti: Sapphire |
| 12 | " | Alkali atoms | Ti: Sapphire |
| 13 | " | Sodium | Dye Laser, Raman shifted Nd, Ti: Sapphire |
| 14 | Ar/He | Cesium 1 PPM | Diode |

The described example embodiments are merely a few examples of combinations of lasers and gases which may be used to accomplish the present invention. It is appreciated that many others types of lasers and gases may be used to accomplish the results of the present invention and that the present invention should not be limited to those embodiments described herein. For example, any combination of molecules and lasers where the molecules may be excited by the lasers may be used. Additionally, the percentage of molecules in relation to the shielding gas or carrier molecules may vary depending on factors such as the specific gases used in the present invention, the specific lasers used, the application of the invention, and the arc re-direction and constriction properties of the mixtures.

The present invention may be implemented using a two-color laser. The wavelength of the two colors may be 0.532 and 0.58 microns. At this color separation the energy associated with the frequency difference between these two laser beams is equal to the vibrational energy of oxygen. The two laser beams are co-propagating with simultaneous pulses, and therefore, drive oxygen into its vibrationally excited state by a non-linear process called stimulated Raman scattering. This is a two-photon frequency difference process, where the photons of one color are augmented as the photons of the other color are depleted. Since the pumping mechanism is proportional to the product, very long path lengths are possible. In such an embodiment, as well as others, an electrode voltage potential may be maintained below the breakdown threshold and no arc formed until the line of vibrationally excited molecules is written.

EXAMPLE APPLICATIONS

The present invention may be used in various applications. As discussed, the guidance of electric discharge via a beam path having vibrationally excited molecules may be used in laser-arc welding processes. More specifically, the present invention may be used for:

1. precision welding;
2. deep groove welding;
3. high speed welding;
4. contour welding; and
5. deep penetration welding.

Apart from welding applications, the present invention may be used for:

1. cutting and drilling;
2. surface heat treatment; and
3. surface marking.

The present invention also includes a method of directing a natural lightning discharge through the earth's atmosphere and along a first vector path to the earth. This method applies the principles of present invention as applied in the guidance of electric arcs as discussed above. The method of directing natural lighting discharges comprises the steps: (a) providing a laser beam through the earth's atmosphere and along a first vector path, the earth's atmosphere comprising molecules amenable to vibrational excitation by the laser beam, so as to define a beam path, the beam path directed along a first vector path comprising molecules vibrationally excited by the laser beam without substantially heating the atmosphere; and (b) allowing a natural lightning discharge to propagate along a second vector path so as to intersect the first vector path, whereby the natural lightning discharge is directed along the first vector path and through the vibrationally excited molecules to the earth. Essentially, as similarly discussed above, natural lighting may be guided along a beam path containing vibrationally excited molecules. Multiple beam paths may be established in the atmosphere or air in various patterns, e.g. grids, to maximize the probability of lighting interference. The cross-sections of the beam paths may vary based on the type of laser used.

The method of the present invention may be practiced through the use of one or more lasers of appropriate strength directed through the earth's atmosphere and along a vector along which it is desired to direct a natural lightning discharge. The laser(s) may be supported by a pre-existing support such as a building tower, or electrical or telephone wire support poles or towers, or a support especially constructed for the purpose of supporting the laser(s).

The present invention may also be applied to control the frequency and the pattern of energy deposition into a volume to produce a volumetric acoustic source. Such a source could be used as a versatile, high fidelity sound source, or for noise suppression.

The present invention may be applied to control the volumetric discharge filamentation for the reflection, refraction, or defraction of electromagnetic waves. By properly choosing the spacing between plasma filaments, the plasma could be used as a multi-layer dielectric medium or volumetric grating. Such a plasma could be deployed to protect sensitive instrumentation from high power electromagnetic radiation, and would deflect electromagnetic waves which are above the nominal plasma cut-off frequency because of the large index-of-refraction gradients associated with the filamentation.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method of initiating an electrical discharge arc, said method comprising the steps of:
   (a) providing a laser beam through an arc shielding gas, said gas comprising molecules amenable to vibrational excitation by said laser beam, so as to define a beam path comprising molecules vibrationally excited by said laser beam without substantially heating said gas; and
   (b) propagating an electrical discharge arc along said laser beam path and through said vibrationally excited molecules.

2. A method according to claim 1 wherein said laser beam and said electrical discharge arc are maintained substantially continuously.

3. A method according to claim 1 wherein said laser beam and said electrical discharge arc are pulsed.

4. A method according to claim 3 wherein the pulse of said laser beam ranges in duration from whole seconds to whole nanoseconds.

5. A method according to claim 3 wherein the pulse of said electrical discharge arc ranges in duration from whole seconds to whole nanoseconds.

6. A method according to claim 1 wherein said laser beam is maintained substantially continuously while said electrical discharge arc is pulsed.

7. A method according to claim 1 wherein said arc shielding gas comprises a mixture of gases.

8. A method according to claim 1 wherein said arc shielding gas comprises a gas selected from the group consisting of argon, helium, and carbon dioxide and wherein said molecules may be selected from the group consisting of carbon monoxide, oxygen, nitrogen, cesium, and aromatic hydrocarbons.

9. A method of directing an electrical discharge arc along a first vector path, said method comprising the steps of:
   (a) providing a laser beam through an arc shielding gas, said gas comprising molecules amenable to vibrational excitation by said laser beam, so as to define a beam path, said beam path directed along a first vector path comprising molecules vibrationally excited by said laser beam without substantially heating said gas; and
   (b) propagating an electrical discharge arc along a second vector path so as to intersect said first vector path, whereby said electrical discharge arc is directed along said first vector path and through said vibrationally excited molecules.

10. A method according to claim 9 wherein said laser beam and said electrical discharge arc are maintained substantially continuously.

11. A method according to claim 9 wherein said laser beam and said electrical discharge arc are pulsed.

12. A method according to claim 11 wherein the pulse of said laser beam ranges in duration from whole seconds to whole milliseconds.

13. A method according to claim 9 wherein said laser beam is maintained substantially continuously while said electrical discharge arc is pulsed.

14. A method according to claim 11 or 13 wherein the pulse of said electrical discharge arc ranges in duration from whole seconds to whole microseconds.

15. A method according to claim 9 wherein said arc shielding gas comprises a mixture of gases.

16. A method according to claim 9 wherein said arc shielding gas comprises a gas selected from the group consisting of carbon monoxide, oxygen and nitrogen.

17. A method of constricting an electrical discharge arc, said method comprising the steps of:
   (a) providing a laser beam through an arc shielding gas, said gas comprising molecules amenable to vibrational excitation by said laser beam, so as to define a beam path, said beam path having a first cross-section area and comprising molecules vibrationally excited by said laser beam without substantially heating said gas; and
   (b) propagating an electrical discharge arc initially having a second cross-section area greater than said first cross-section area along said beam path and through said vibrationally excited molecules, whereby said electrical discharge arc is constricted so as to have a cross-section area less than said second cross-section area.

18. A method according to claim 17 wherein said laser beam and said electrical discharge arc are maintained substantially continuously.

19. A method according to claim 17 wherein said laser beam and said electrical discharge arc are pulsed.

20. A method according to claim 19 wherein the pulse of said laser beam ranges in duration from whole seconds to whole milliseconds.

21. A method according to claim 17 wherein said laser beam is maintained substantially continuously while said electrical discharge arc is pulsed.

22. A method according to claim 19 or 21 wherein said pulse of said electrical discharge arc ranges in duration from whole seconds to whole microseconds.

23. A method according to claim 17 wherein said arc shielding gas comprises a mixture of gases.

24. A method according to claim 17 wherein said arc shielding gas comprises a gas selected from the group consisting of carbon monoxide, oxygen and nitrogen.

25. An apparatus for initiating an electrical discharge arc, said apparatus comprising:
   (a) a source of an arc shielding gas;
   (b) a laser adapted to provide a laser beam through said arc shielding gas, said gas comprising molecules amenable to vibrational excitation by said laser beam, so as to define a beam path comprising molecules vibrationally excited by said laser beam without substantially heating said gas; and
   (c) a source of an electrical discharge arc adapted to provide an electrical discharge along said laser beam path and through said vibrationally excited molecules.

26. An apparatus according to claim 25 wherein said laser is adapted to maintain said laser beam substantially continuously, and said source of an electrical discharge is adapted to maintain said electrical discharge arc substantially continuously.

27. An apparatus according to claim 25 wherein said laser is adapted to pulse said laser beam, and said source of an electrical discharge is adapted to pulse said electrical discharge arc.

28. An apparatus according to claim 27 wherein said laser is adapted to pulse said laser beam in pulses ranging in duration from whole seconds to whole milliseconds.

29. An apparatus according to claim 25 wherein said laser is adapted to maintain said laser beam substantially continuously, and said source of an electrical discharge is adapted to pulse said electrical discharge arc.

30. An apparatus according to claim 27 or 29 wherein said source of an electrical discharge is adapted to pulse said electrical discharge arc in pulses ranging in duration from whole seconds to whole microseconds.

31. An apparatus according to claim 25 wherein said arc shielding gas comprises a mixture of gases.

32. An apparatus according to claim 25 wherein said arc shielding gas comprises a gas selected from the group consisting of argon, helium, and carbon dioxide and wherein said molecules may be selected from the group consisting of carbon monoxide, oxygen, nitrogen, alkali atoms, and aromatic hydrocarbons.

33. An industrial heat source adapted to perform an operation selected from the group consisting of welding, cutting, drilling, surface treating, and combinations thereof, said industrial heat source comprising an apparatus according to claim 25.

34. An industrial heat source according to claim 33 additionally comprising a robotic device adapted to position said industrial heat source.

35. An apparatus for directing an electrical discharge arc along a first vector path, said apparatus comprising:
(a) a source of an arc shielding gas;
(b) a laser adapted to provide a laser beam through said arc shielding gas, said gas comprising molecules amenable to vibrational excitation by said laser beam, so as to define a beam path said beam path directed along a first vector path comprising molecules vibrationally excited by said laser beam without substantially heating said gas; and
(c) a source of an electrical discharge arc adapted to provide an electrical discharge along a second vector path so as to intersect said first vector path, whereby said electrical discharge arc is directed along said first vector path and through said vibrationally excited molecules.

36. An apparatus according to claim 35 wherein said laser is adapted to maintain said laser beam substantially continuously, and said source of an electrical discharge is adapted to maintain said electrical discharge arc substantially continuously.

37. An apparatus according to claim 35 wherein said laser is adapted to pulse said laser beam, and said source of an electrical discharge is adapted to pulse said electrical discharge arc.

38. An apparatus according to claim 37 wherein said laser is adapted to pulse said laser beam in pulses ranging in duration from whole seconds to whole milliseconds.

39. An apparatus according to claim 35 wherein said laser is adapted to maintain said laser beam substantially continuously, and said source of an electrical discharge is adapted to pulse said electrical discharge arc.

40. An apparatus according to claim 37 or 39 wherein said source of an electrical discharge is adapted to pulse said electrical discharge arc in pulses ranging in duration from whole seconds to whole microseconds.

41. An apparatus according to claim 35 wherein said arc shielding gas comprises a mixture of gases.

42. An apparatus according to claim 35 wherein said arc shielding gas comprises a gas selected from the group consisting of argon, helium, and carbon dioxide and wherein said molecules may be selected from the group consisting of carbon monoxide, oxygen and nitrogen.

43. An industrial heat source adapted to perform an operation selected from the group consisting of welding, cutting, drilling, surface treating, and combinations thereof, said industrial heat source comprising an apparatus according to claim 35.

44. An industrial heat source according to claim 43 additionally comprising a robotic device adapted to position said industrial heat source.

45. An apparatus for directing an electrical discharge arc along a first vector path, said apparatus comprising:
(a) a source of an arc shielding gas;
(b) a laser adapted to provide a laser beam through an arc shielding gas, said gas comprising molecules amenable to vibrational excitation by said laser beam, so as to define a beam path, said beam path having a first cross-section area and comprising molecules vibrationally excited by said laser beam without substantially heating said gas; and
(c) a source of an electrical discharge arc adapted to provide an electrical discharge arc initially having a second cross-section area greater than said first cross-section area along said beam path and through said vibrationally excited molecules, whereby said electrical discharge arc is constricted so as to have a cross-section area less than said second cross-section area.

46. An apparatus according to claim 45 wherein said laser is adapted to maintain said laser beam substantially continuously, and said source of an electrical discharge is adapted to maintain said electrical discharge arc substantially continuously.

47. An apparatus according to claim 45 wherein said laser is adapted to pulse said laser beam, and said source of an electrical discharge is adapted to pulse said electrical discharge arc.

48. An apparatus according to claim 47 wherein said laser is adapted to pulse said laser beam in pulses ranging in duration from whole seconds to whole milliseconds.

49. An apparatus according to claim 45 wherein said laser is adapted to pulse said laser beam, and said source of an electrical discharge is adapted to maintain said electrical discharge arc substantially continuously.

50. An apparatus according to claim 47 or 49 wherein said source of an electrical discharge is adapted to pulse said electrical discharge arc in pulses ranging in duration from whole seconds to whole microseconds.

51. An apparatus according to claim 45 wherein said arc shielding gas comprises a mixture of gases.

52. An apparatus according to claim 45 wherein said arc shielding gas comprises a gas selected from the group consisting of argon, helium, and carbon dioxide and wherein said molecules may be selected from the group consisting of carbon monoxide, oxygen and nitrogen.

53. An industrial heat source adapted to perform an operation selected from the group consisting of welding, cutting, drilling, surface treating, and combinations thereof, said industrial heat source comprising an apparatus according to claim 45.

54. An industrial heat source according to claim 53 additionally comprising a robotic device adapted to position said industrial heat source.

55. A method of directing a natural lightning discharge through the earth's atmosphere and along a first vector path to the earth, said method comprising the steps:
(a) providing a laser beam through the earth's atmosphere and along a first vector path, said gas comprising molecules amenable to vibrational excitation by said laser beam, so as to define a beam path, said beam path directed along a first vector path comprising molecules vibrationally excited by said laser beam without substantially heating said atmosphere; and
(b) allowing a natural lightning discharge to propagate along a second vector path so as to intersect said first vector path, whereby said natural lightning discharge is directed along said first vector path and through said vibrationally excited molecules to the earth.

* * * * *